(12) United States Patent
Chen et al.

(10) Patent No.: US 11,314,342 B2
(45) Date of Patent: Apr. 26, 2022

(54) MOUSE DEVICE

(71) Applicant: Chicony Electronics Co., Ltd., New Taipei (TW)

(72) Inventors: Tao-Kuan Chen, New Taipei (TW); Huei-Chen Wong, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/323,106

(22) Filed: May 18, 2021

(65) Prior Publication Data

US 2021/0365129 A1 Nov. 25, 2021

(30) Foreign Application Priority Data

May 21, 2020 (TW) .................................. 109116989

(51) Int. Cl.
*G06F 3/0354* (2013.01)
*G06F 3/02* (2006.01)

(52) U.S. Cl.
CPC ............ *G06F 3/03543* (2013.01); *G06F 3/02* (2013.01)

(58) Field of Classification Search
None
See application file for complete search history.

(56) References Cited

U.S. PATENT DOCUMENTS

2007/0262954 A1* 11/2007 Na ........................ G06F 3/0338
345/156
2019/0107900 A1* 4/2019 Tseng .................. G06F 3/03543

FOREIGN PATENT DOCUMENTS

CN 209590797 U 11/2019
TW M595255 U 5/2020

* cited by examiner

*Primary Examiner* — Carl Adams
(74) *Attorney, Agent, or Firm* — Muncy, Geissler, Olds & Lowe, P.C.

(57) ABSTRACT

A mouse device includes a casing, a button, and an elastic guiding structure. The casing includes a shell plate. The shell plate has a through hole, and the through hole has a hole edge. The button is disposed on the shell plate. The button includes a switch-triggering member, and the switch-triggering member is penetrated through the through hole. The elastic guiding member includes a first elastic bar and a second elastic bar. The first elastic bar is disposed at the hole edge and extends toward the switch-triggering member to have a first free end. The second elastic bar is disposed at the hole edge and extends toward the switch-triggering member to have a second free end. The switch-triggering member is sandwiched between the first free end and the second free end.

12 Claims, 6 Drawing Sheets

MOUSE DEVICE

CROSS-REFERENCE TO RELATED APPLICATION

This non-provisional application claims priority under 35 U.S.C. § 119(a) to Patent Application No. 109116989 filed in Taiwan, R.O.C. on May 21, 2020, the entire contents of which are hereby incorporated by reference.

BACKGROUND

Technical Field

The instant disclosure relates to peripherals for computers, in particular, to a mouse device.

Related Art

Mice are common input devices for computers. Regarding the operations of the mouse, the button is a component which is most frequently operated. For example, the user may select certain item(s) or trigger certain action(s) by pressing the button and controlling the cursor of the mouse. Therefore, the operation feeling of the button is important for the user.

SUMMARY

In general, components (e.g., casing or button) of mice known to the inventor have assembling tolerances and/or size tolerances. As a result, when the button of a mouse known to the inventor is assembled, owing to the tolerances, the button may be assembled improperly to be slantingly arranged or to be deflected from its original position. Hence, the button and other components of the mouse may interfere with or squeeze to each other, thereby affecting the operation feeling of the button for the user. Furthermore, the deflection of the button also causes the spacing on the mouse to be not uniform (for example, the spacing between the right button and the left button of the mouse may be not uniform), and thus the product quality is affected.

In view of this, in one embodiment, a mouse device is provided. The mouse device comprises a casing, a button, and an elastic guiding structure. The casing comprises a shell plate. The shell plate has a through hole, and the through hole has a hole edge. The button is disposed on the shell plate. The button comprises a switch-triggering member, and the switch-triggering member is penetrated through the through hole. The elastic guiding member comprises a first elastic bar and a second elastic bar. The first elastic bar is disposed at the hole edge and extends toward the switch-triggering member to have a first free end. The second elastic bar is disposed at the hole edge and extends toward the switch-triggering member to have a second free end. The switch-triggering member is sandwiched between the first free end and the second free end.

As above, in the mouse device of one or some embodiments of the instant disclosure, the first elastic bar and the second elastic bar are disposed at the hole edge, and the switch-triggering member of the button is sandwiched between the first free end of the first elastic bar and the second free end of the second elastic bar. Therefore, when the button is assembled on the shell plate deflectedly, the first elastic bar or the second elastic bar can provide elastic force to guide the button to a predetermined position of the button, thereby preventing the deflection of the button and thus providing a proper operation feeling and sensitivity for the user during operation. Moreover, in one or some embodiments of the instant disclosure, the mouse device can have a beautiful appearance to improve the product quality.

BRIEF DESCRIPTION OF THE DRAWINGS

The disclosure will become more fully understood from the detailed description given herein below for illustration only, and thus not limitative of the disclosure, wherein.

DETAILED DESCRIPTION

Embodiments are provided for facilitating the descriptions of the instant disclosure. However, the embodiments are provided as examples for illustrative purpose, but not a limitation to the instant disclosure. In all the figures, same reference numbers designate identical or similar elements.

Figure 1:
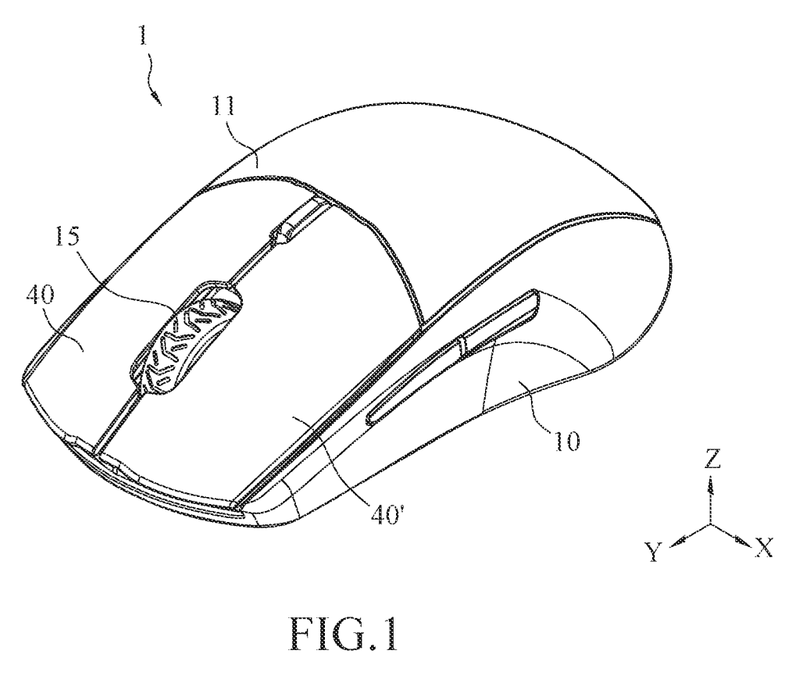
FIG. 1 illustrates a perspective view of a mouse device according to a first embodiment of the instant disclosure.
Figure 2:
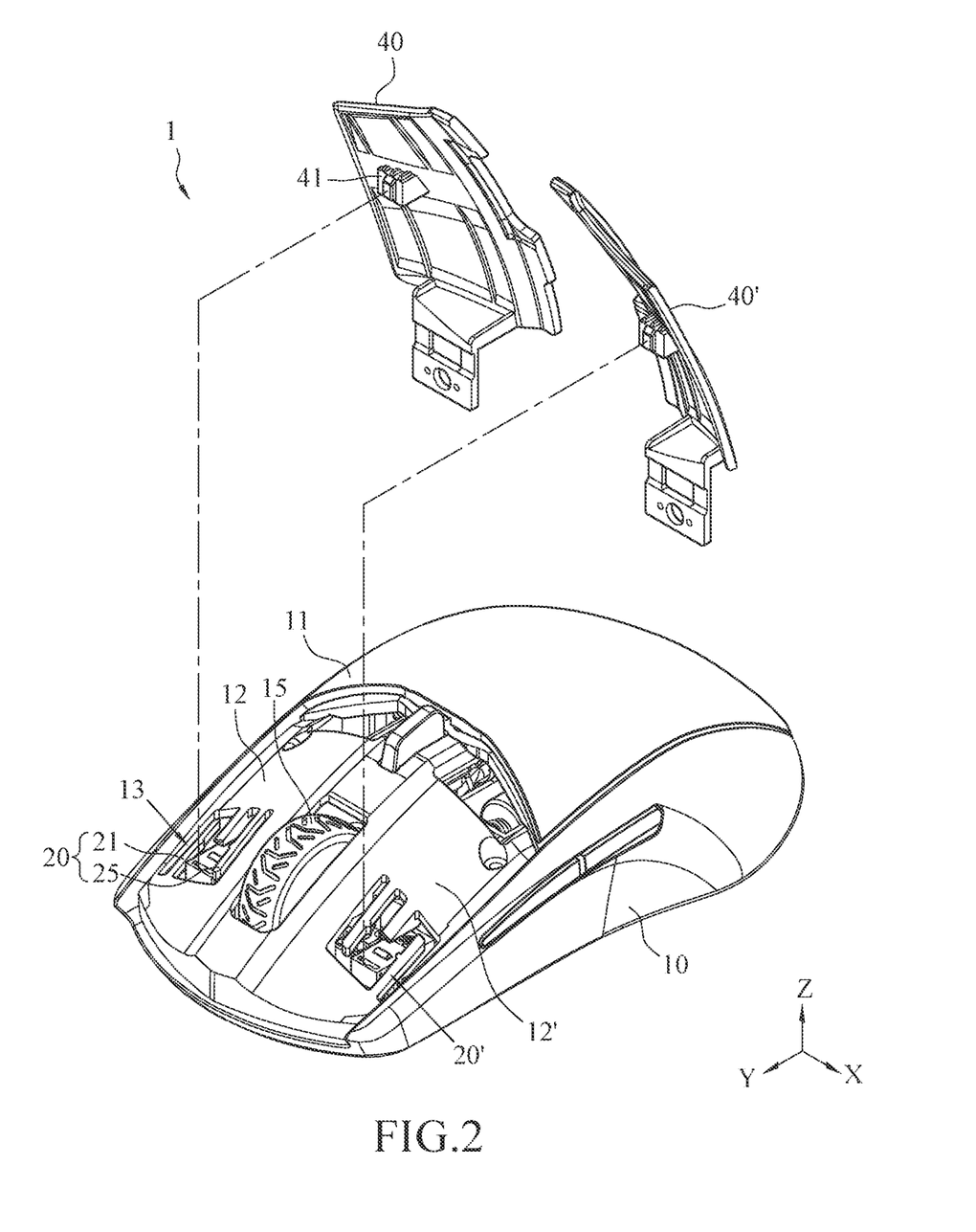
FIG. 2 illustrates an exploded view of the mouse device of the first embodiment.
Figure 3:
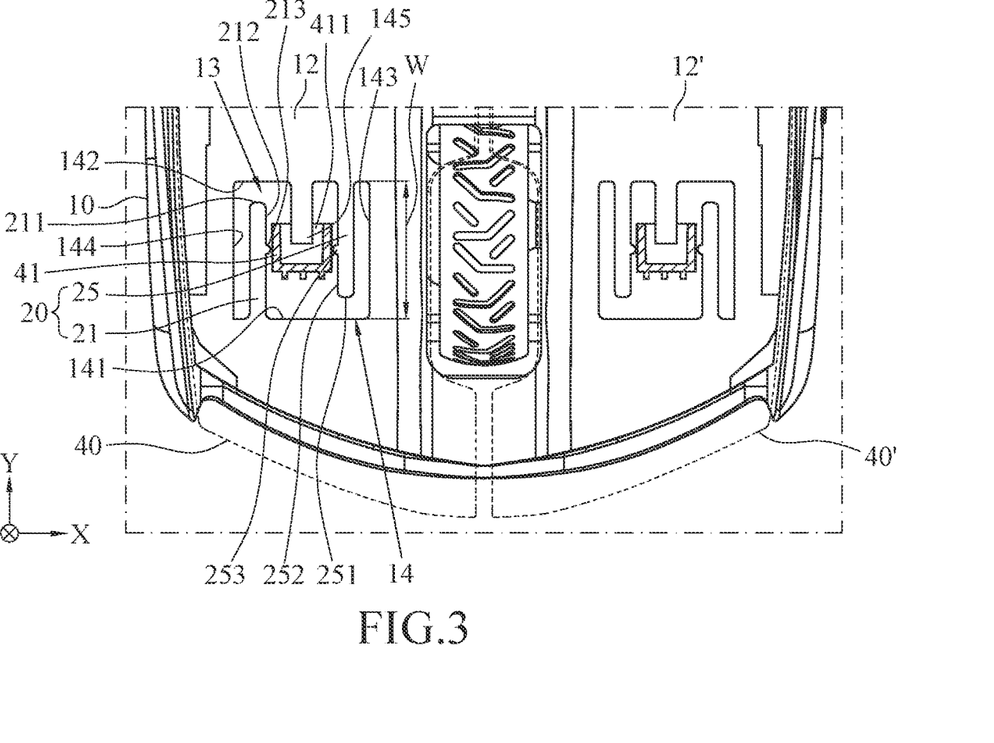
FIG. 3 illustrates a partial top view of the mouse device of the first embodiment.

FIG. 1 illustrates a perspective view of a mouse device 1 according to a first embodiment of the instant disclosure. FIG. 2 illustrates an exploded view of the mouse device of the first embodiment. FIG. 3 illustrates a partial top view of the mouse device of the first embodiment. As shown in FIGS. 1 to 3, the mouse device 1 is an input device for a computer, and the mouse device 1 is provided for controlling the mouse curser of the computer (e.g., a personal computer, a notebook computer, or a tablet computer) to move, to select item(s), or to perform other actions.

In some embodiments, specifically, the mouse device 1 may be a mechanical mouse, an optical mouse, or a laser mouse. With regard to the transmission method, the mouse device 1 may be a wired mouse. For example, the mouse device 1 may be connected to the port (e.g., a USB port) of the computer through a cable, so that the mouse device 1 can transmit data to the computer through the cable. Alternatively, the mouse device 1 may be a wireless mouse, and the mouse device can wirelessly transmit data to the computer through emitting infrared radiofrequency signals or Bluetooth signals.

As shown in FIGS. 1 to 3, the mouse device 1 comprises a casing 10, at least one elastic guiding structure 20, and at least one button 40. In this embodiment, the mouse device 1 is a two-button mouse and comprises two buttons 40, 40' (namely, the right button and the left button), but embodiments are not limited thereto. In some embodiments, the mouse device 1 may be a single-button mouse or may be a mouse having three or more buttons. The elastic guiding structure 20 is disposed on the casing 10 and corresponds to the button 40. When the button 40 is assembled on the casing 10, the elastic guiding structure 20 guides the button 40 to be assembled properly to prevent deflection of the button 40. Descriptions of functions of the elastic guiding structure 20 are provided in the following paragraphs.

In some embodiments, another elastic guiding structure 20' may be disposed on the casing 10 of the mouse device 1 to correspond to another button 40' (as shown in FIG. 2, the left button), and the another elastic guiding structure 20' may have a structure same as or similar to that of the elastic guiding structure 20. Therefore, when the another button 40' is assembled on the casing 10, the another elastic guiding structure 20' guides the another button 40' to be assembled properly to prevent deflection of the another button 40'. In the following paragraphs, the configuration between one of the buttons 40, 40' (here, the button 40) and the corresponding elastic guiding structure 20 are described.

As shown in FIGS. 2 and 3, the casing 10 is a hollowed shell and comprises a shell plate 11. The shell plate 11 has two button assembling regions 12, 12' adjacent to each other, and the two button assembling regions 12, 12' are provided for respectively assembling the two buttons 40, 40' thereon. In this embodiment, a wheel 15 is assembled on the casing 10, and the two button assembling regions 12, 12' are respectively at the left side and the right side of the wheel 15, but embodiments are not limited thereto.

As shown in FIGS. 2 and 3, the button assembling region 12 of the shell plate 11 has a through hole 13, and the through hole 13 is defined through the casing 10 and has a hole edge 14. In this embodiment, the through hole 13 is a rectangular hole. The hole edge 14 of the through hole 13 comprises a first edge 141, a second edge 142 opposite to the first edge 141, a third edge 143, and a fourth edge 144 opposite to the third edge 143. The first edge 141 and the second edge 142 are respectively connected to the third edge 143 and the fourth edge 144, such that the first edge 141, the second edge 142, the third edge 143, and the fourth edge 144 together form the through hole 13 in a rectangular shape. However, it should be noted that the shape of the through hole 13 in the embodiment are provided for illustrative purposes, not limitations to the instant disclosure. In some embodiments, the through hole 13 may be a round hole, an elliptical hole, a trapezoidal hole, an elongated, or a hole in other shapes.

As shown in FIGS. 2 and 3, the button 40 is disposed on the button assembling region 12 of the shell plate 11, and the button 40 comprises a switch-triggering member 41. The switch-triggering member 41 is penetrated through the through hole 13. In FIG. 3, the button 40 is presented by a perspective view, such that the relative relationship between the switch-triggering member 41 and the elastic guiding structure 20 can be clearly presented. Specifically, in this embodiment, the switch-triggering member 41 may be a protruding block, and the protruding block correspondingly passes through the through hole 13 so as to be inserted into the casing 10. Therefore, when the button 40 is pressed, the switch-triggering member 41 can correspondingly trigger the switch inside the casing 10 so as to generate a corresponding signal for controlling the mouse cursor of the mouse device 1.

As shown in FIGS. 2 and 3, the elastic guiding structure 20 is in the through hole 13 and comprises a first elastic bar 21 and a second elastic bar 25. The first elastic bar 21 and the second elastic bar 25 are disposed at the hole edge 14. For example, in this embodiment, the first elastic bar 21 is disposed at the first edge 141 and extends toward the second edge 142 and the switch-triggering member 41 to have a first free end 211, and the second elastic bar 25 is disposed at the second edge 142 and extends toward the first edge 141 and the switch-triggering member 41 to have a second free end 251.

Further, as shown in FIGS. 2 and 3, the switch-triggering member 41 of the button 40 is further sandwiched between the first free end 211 of the first elastic bar 21 and the second free end 251 of the second elastic bar 25. It is understood that, in this embodiment, the term "sandwiched between" is used to indicate that, the switch-triggering member 41 is between the first free end 211 and the second free end 251, and spacing are between the first elastic bar 21 and the switch-triggering member 41 and between the second elastic bar 25 and the switch-triggering member 41, such that the switch-triggering member 41 does not contact the first elastic bar 21 or the second elastic bar 25. Alternatively, in some embodiments, the term "sandwiched between" may be used to indicate that, the switch-triggering member 41 is between the first free end 211 and the second free end 251, and the switch-triggering member 41 contact the first elastic bar 21, or contacts the second elastic bar 25, or contacts both the first elastic bar 21 and the second elastic bar 25.

Based on the above, according to one or some embodiments of the instant disclosure, during assembling the button 40 on the shell plate 11, if the button 40 is deflected from the predetermined position on the shell plate 11 due to size tolerances or assembling tolerances, the first elastic bar 21 or the second elastic bar 25 is pressed by the switch-triggering member 41 to generate an elastic force, such that the elastic force guides the switch-triggering member 41 to be at the predetermined position. Therefore, the button 40 can be prevented from being deflected so as to provide a proper operation feeling and sensitivity for the user during operation. Moreover, in one or some embodiments of the instant disclosure, the appearance of the mouse device 1 can have a beautiful appearance to improve the product quality.

The elastic guiding structure may have following embodiments, and these embodiments are described with accompanied drawings.

As shown in FIGS. 2 and 3, in this embodiment, the first elastic bar 21 integrally extends from the first edge 141, the second elastic bar 25 integrally extends from the second edge 142, such that the first elastic bar 21, the second elastic bar 25, and the shell plate 11 are formed as a one-piece structure. Hence, the manufacturing costs and the manufacturing steps for the mouse device 1 can be reduced.

Further, as shown in FIG. 3, in this embodiment, the two buttons 40, 40' on the shell plate 11 are arranged along an arrangement direction (in this embodiment, the arrangement direction is the X-axis direction). The third edge 143 of the hole edge 14 is adjacent to the another button 40', as compared to the fourth edge 144 (namely, the distance between the third edge 143 and the another button 40' is shorter than the distance between the fourth edge 144 and the another button 40'). Therefore, the extension direction of the first elastic bar 21 and the extension direction of the second elastic bar 25 (in this embodiment, the extension direction is the Y-axis direction) are perpendicular to the arrangement direction. Moreover, in this embodiment, the first elastic bar 21 and the second elastic bar 25 are substantially in parallel with each other, and the hole edge 14 has a width W (the distance between the first edge 141 and the second edge 142). Furthermore, in this embodiment, the length of the first elastic bar 21 and the length of the second elastic bar 25 is greater than half of the width W of the hole edge 14. For example, supposed that the width W of the hole edge 14 (the distance between the first edge 141 and the second edge 142) is 2 cm, the length of the first elastic bar 21 and the length of the second elastic bar 25 are both greater than 1 cm, such that the first elastic bar 21 and the second elastic bar 25 have overlapped portions.

Accordingly, during assembling the button 40 on the shell plate 11, if the button 40 deflects from the predetermined position toward the fourth edge 144, the first elastic bar 21 is pressed by the switch-triggering member 41, such that the first elastic bar 21 bends and deforms to generate an elastic force toward the third edge 143. Therefore, the elastic force guides the switch-triggering member 41 to allow the button 40 to be kept at the predetermined position of the shell plate 11. Similarly, if the button 40 deflects from the predetermined position toward the third edge 143, the second elastic bar 25 is pressed by the switch-triggering member 41, such that the second elastic bar 25 bends and deforms to generate an elastic force toward the fourth edge 144. Therefore, the elastic force guides the switch-triggering member 41 to allow the button 40 to be kept at the predetermined position of the shell plate 11. Accordingly, the button 40 can be prevented from being deflected so as to provide a proper operation feeling and sensitivity for the user during operation. Moreover, the mouse device 1 can be prevented from having non-uniform spacing on the outer surface of the mouse device 1 (for example, the spacing between the two buttons 40, 40' of the mouse device 1), such that the product quality of the mouse device 1 can be improved.

However, it is understood that, the embodiment shown in FIG. 3 is provided for illustrative purposes, not a limitation to the instant disclosure. In some embodiments, the first elastic bar 21 and the second elastic bar 25 may be not arranged in parallel with each other. In such configuration, the switch-triggering member 41 still can be guided by the elastic force to allow the button 40 to be kept at the predetermined position of the shell plate 11.

In some embodiments, as shown in FIG. 3, the first elastic bar 21 has a first side portion 212 adjacent to the second elastic bar 25, and the second elastic bar 25 has a second side portion 252 adjacent to the first elastic bar 21. The first side portion 212 has a first protrusion 213 adjacent to the first free end 211, the second side portion 252 has a second protrusion 253 adjacent to the second free end 251, and the switch-triggering member 41 of the button 40 is sandwiched between the first protrusion 213 and the second protrusion 253. Accordingly, during assembling the button 40 on the shell plate 11, if the button 40 is deflected, the button 40 abuts against the first protrusion 213 or the second protrusion 253 in a point-contact manner. Hence, the friction and contact area between the button 40 and the elastic guiding structure 20 can be further reduced, thereby facilitating in assembling the button 40 on the shell plate 11.

Further, as shown in FIG. 3, in some embodiments, the switch-triggering member 41 of the button 40 comprises a slot 411. An engaging member 145 extends from the hole edge 14 of the through hole 13, and the engaging member 145 is correspondingly received in the slot 411, such that the button 40 can be limited from being deflected. In this embodiment, the engaging member 145 is an extension arm extending from the second edge 142 and passing through the slot 411, thereby further preventing the button 40 from being deflected in the Y-axis direction.

Figure 4:
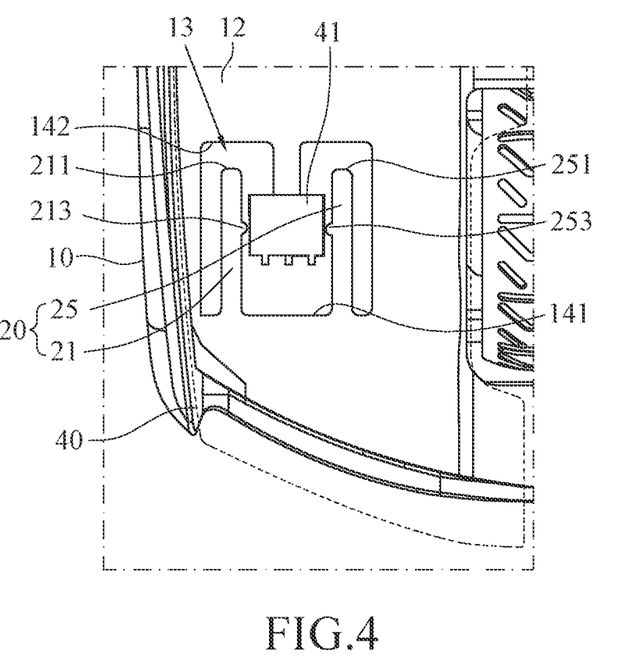
FIG. 4 illustrates a partial top view of a mouse device according to a second embodiment of the instant disclosure.

However, it is understood that, the aforementioned embodiments are provided for illustrative purposes, not a limitation to the instant disclosure. In some embodiments, the first elastic bar 21 and the second elastic bar 25 may be disposed at one of the edges of the hole edge 14. For example, please refer to FIG. 4. FIG. 4 illustrates a partial top view of a mouse device 1 according to a second embodiment of the instant disclosure. In this embodiment, the first elastic bar 21 and the second elastic bar 25 respectively extend from the first edge 141 toward the second edge 142 and the switch-triggering member 41.

Figure 5:
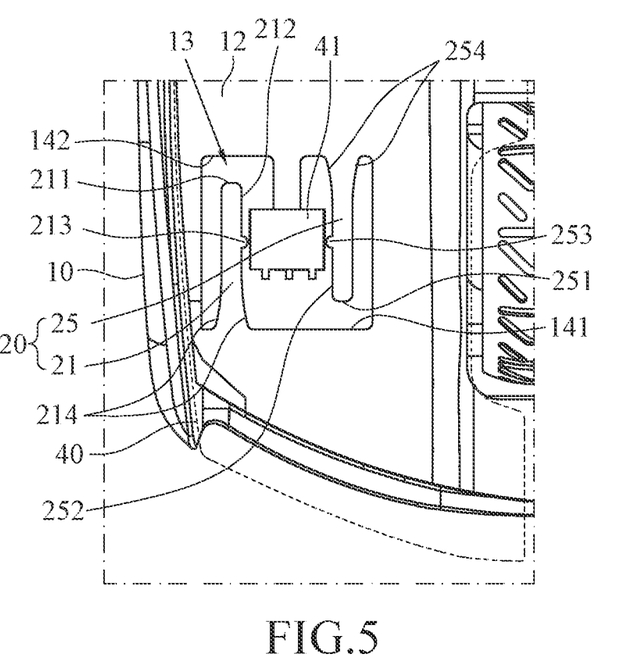
FIG. 5 illustrates a partial top view of a mouse device according to a third embodiment of the instant disclosure.

FIG. 5 illustrates a partial top view of a mouse device 1 according to a third embodiment of the instant disclosure. As shown in FIG. 5, one of the differences between the embodiment shown in FIG. 3 and the embodiment shown in FIG. 5 is that, in this embodiment, two first reinforcing blocks 214 are integrally connected to two corners between the first elastic bar 21 and the first edge 141 for increasing the structural strength of the first elastic bar 21. Therefore, when the first elastic bar 21 is forced, the stress can be prevented from concentrating on the corners between the first elastic bar 21 and the first edge 141, thereby preventing the first elastic bar 21 from being broken easily or preventing the first elastic bar 21 from exceeding the elasticity limit. Similarly, two second reinforcing blocks 254 may be integrally connected to two corners between the second elastic bar 25 and the second edge 142 for increasing the structural strength of the second elastic bar 25. In some embodiments, the edge of the first reinforcing block 214 and the edge of the second reinforcing block 254 may have smooth curves, thereby facilitating in reducing the stress on the corners of the first elastic bar 21 (or the corners on the second elastic bar 25).

Figure 6:
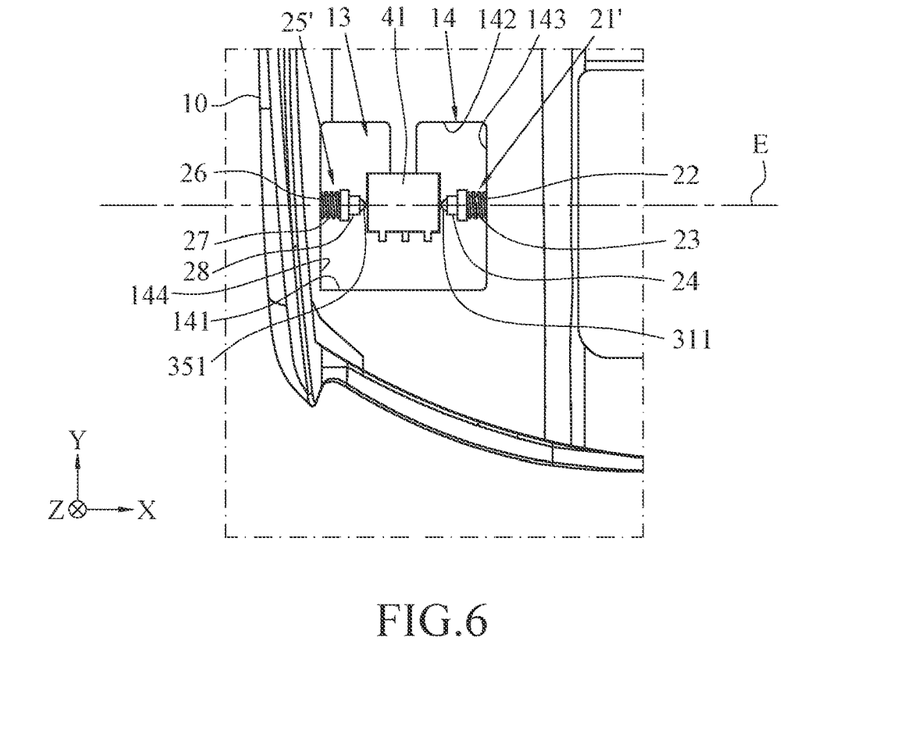
FIG. 6 illustrates a partial top view of a mouse device according to a fourth embodiment of the instant disclosure.
Figure 7:
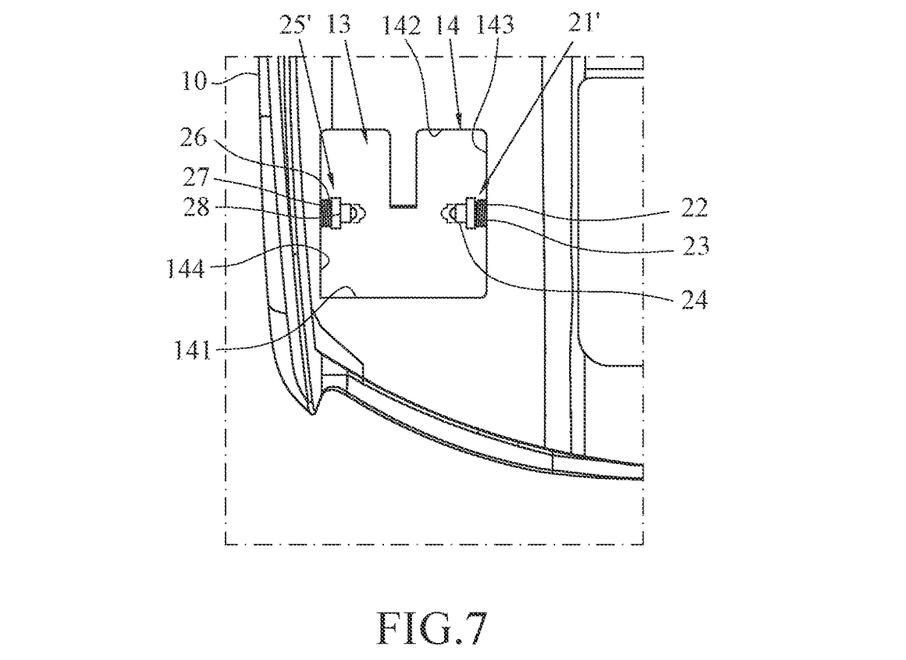
FIG. 7 illustrates a schematic operational view of the mouse device of the fourth embodiment.

FIGS. 6 and 7 respectively illustrate a partial top view and a schematic operational view of a mouse device 1 according to a fourth embodiment of the instant disclosure. As shown in FIGS. 6 and 7, one of the differences between the embodiment shown in FIG. 3 and the embodiment shown in FIGS. 6 and 7 is that, in this embodiment, the first elastic bar 21' and the second elastic bar 25' are retractable elastic bars and arranged along a same imaginary extension line E (in this embodiment, the extension line E is in parallel with the X-axis direction). In this embodiment, the third edge 143 of the hole edge 14 is adjacent to the another button 40', as compared to the fourth edge 144 (namely, the distance between the third edge 143 and the another button 40' is shorter than the distance between the fourth edge 144 and the another button 40', as referring to FIG. 3). The first elastic bar 21' is disposed at the third edge 143 and extends toward the fourth edge 144 and the switch-triggering member 41, and the second elastic bar 25' is disposed at the fourth edge 144 and extends toward the third edge 143 and the switch-triggering member 41. Therefore, the extension direction of the first elastic bar 21' and the extension direction of the second elastic bar 25' (in this embodiment, the extension direction is the X-axis direction) are in parallel with the arrangement direction of the two buttons 40, 40' (in this embodiment, the arrangement direction of the buttons 40, 40' is the X-axis direction).

As shown in FIGS. 6 and 7, in this embodiment, the first elastic bar 21' comprises a first bar body 22, a first spring 23, and a first bar head 24. The first bar body 22 extends from a middle portion of the third edge 143. The first spring 23 is fitted over the first bar body 22. The first bar head 24 is movably disposed at an end portion of the first bar body 22 and is connected to the first spring 23, so that the first bar head 24 is retractable relative to the first bar body 22 to compress the first spring 23. The first free end 311 is at an end portion of the first bar head 24. The second elastic bar 25' and the first elastic bar 21' have the same structure, and the second elastic bar 25' comprises a second bar body 26, a second spring 27, and a second bar head 28. The second bar body 26 extends from a middle portion of the fourth edge 144. The second spring 27 is fitted over the second bar body 26. The second bar head 28 is movably disposed at an end portion of the second bar body 26 and is connected to the second spring 27, so that the second bar head 28 is retractable relative to the second bar body 26 to compress the second spring 27. The second free end 351 is at an end portion of the second bar head 28.

Accordingly, during assembling the button 40 on the shell plate 11, if the button 40 deflects from the predetermined position toward the third edge 143, the first bar head 24 of the first elastic bar 21' is pressed by the switch-triggering member 41, such that the first bar head 24 compresses the first spring 23 to generate an elastic force toward the fourth edge 144 (as shown in FIG. 7). Therefore, the elastic force guides the switch-triggering member 41 to allow the button 40 to be kept at the predetermined position of the shell plate 11. Similarly, if the button 40 deflects from the predetermined position toward the fourth edge 144, the second bar head 28 of the second elastic bar 25' is pressed by the switch-triggering member 41, such that the second bar head 28 compresses the second spring 27 to generate an elastic force toward the third edge 143. Therefore, the elastic force guides the switch-triggering member 41 to allow the button 40 to be kept at the predetermined position of the shell plate 11. Accordingly, the button 40 can be prevented from being deflected so as to provide a proper operation feeling and sensitivity for the user during operation. Moreover, the mouse device 1 can be prevented from having non-uniform spacing on the outer surface of the mouse device 1 (for example, the spacing between the two buttons 40, 40' of the mouse device 1), such that the product quality of the mouse device 1 can be improved.

In some embodiments, the first elastic bar 21' and the second elastic bar 25' may be retractable elastic bars with different structures.

Figure 8:
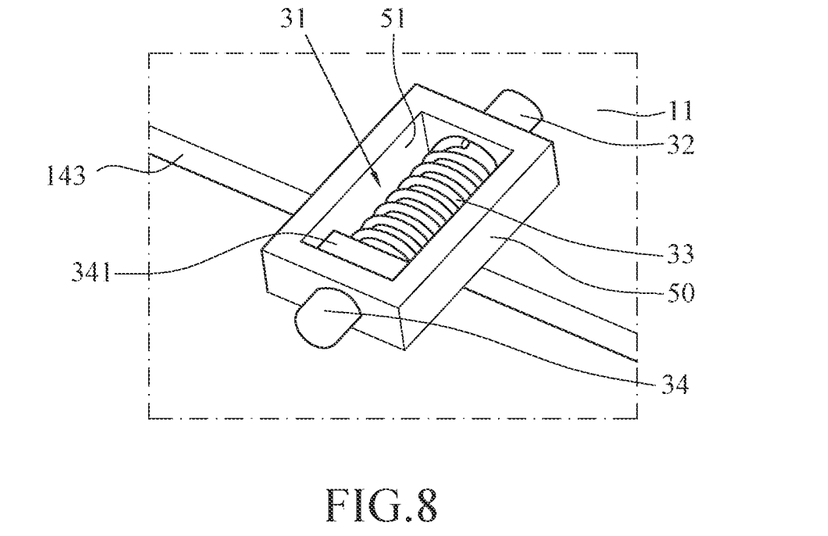
FIG. 8 illustrates a partial perspective view of a mouse device according to a fifth embodiment of the instant disclosure.
Figure 9:
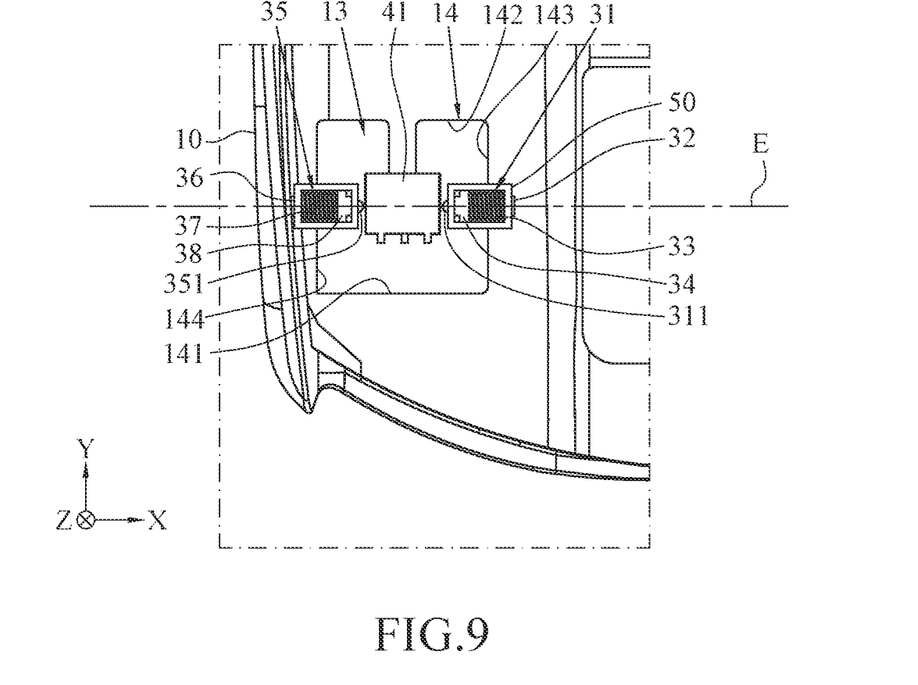
FIG. 9 illustrates a partial top view of the mouse device of the fifth embodiment.

FIGS. 8 and 9 respectively illustrate a partial perspective view and a partial top view of a mouse device 1 according to a fifth embodiment of the instant disclosure. As shown in FIGS. 8 and 9, one of the differences between the embodiment shown in FIG. 3 and the embodiment shown in FIGS. 8 and 9 is that, in this embodiment, the first elastic bar 31 and the second elastic bar 35 are retractable elastic bars and arranged along a same imaginary extension line E (in this embodiment, the extension line E is in parallel with the X-axis direction). In this embodiment, the third edge 143 of the hole edge 14 is adjacent to the another button 40', as compared to the fourth edge 144 (namely, the distance between the third edge 143 and the another button 40' is shorter than the distance between the fourth edge 144 and the another button 40', as referring to FIG. 3). The first elastic bar 31 is disposed at the third edge 143 and extends toward the fourth edge 144 and the switch-triggering member 41, and the second elastic bar 35 is disposed at the fourth edge 144 and extends toward the third edge 143 and the switch-triggering member 41. Therefore, the extension direction of the first elastic bar 31 and the extension direction of the second elastic bar 35 (in this embodiment, the extension direction is the X-axis direction) are in parallel with the arrangement direction of the two buttons 40, 40' (in this embodiment, the arrangement direction of the buttons 40, 40' is the X-axis direction).

As shown in FIGS. 8 and 9, in this embodiment, the first elastic bar 31 comprises a first bar body 32, a first spring 33, and a first bar head 34. The first bar body 32 is retractably disposed at the third edge 143. For example, in this embodiment, a bar base 50 is disposed at a portion of the shell plate 11 adjacent to the third edge 143. The bar base 50 may be assembled on the shell plate 11, or the bar base 50 and the shell plate 11 may be integrally formed as a one-piece structure (for example, through stamping or injection molding), but embodiments are not limited thereto. The first bar body 32 is disposed on the bar base 50 and is movable relative to the bar base 50. The bar base 50 has a groove 51, the first spring 33 is fitted over the first bar body 32 and received in the groove 51. The first bar head 34 is connected to an end portion of the first bar body 32 and is connected to one of two ends of the first spring 33, and the other end of the first spring 33 abuts against the groove wall of the groove 51. Specifically, the first bar head 34 and the first bar body 32 may be integrally formed as a one-piece structure or may be assembled as an assembled structure. The first free end 311 is at an end portion of the first bar head 34 and protrudes from the bar base 50 and the third edge 143. Moreover, the first bar head 34 further has a stopping portion 341 in the groove 51, and the stopping portion 341 abuts against one end of the bar base 50 to prevent the first elastic bar 31 from detaching off the shell plate 11.

As shown in FIGS. 8 and 9, in this embodiment, the second elastic bar 35 comprises a second bar body 36, a second spring 37, and a second bar head 38. The second bar body 36 is retractably disposed at the fourth edge 144. The second spring 37 is fitted over the second bar body 36. The second bar head 38 is connected to an end portion of the second bar body 36 and is connected to the second spring 37. The second free end 351 is at an end portion of the second bar head 38 and protrudes from the fourth edge 144. It is understood that, in one or some embodiments, the first elastic bar 31 and the second elastic bar 35 may have the same structure, thus detailed description of the structure of the second elastic bar 35 is omitted.

Accordingly, during assembling the button 40 on the shell plate 11, if the button 40 deflects from the predetermined position toward the third edge 143, the first bar head 34 of the first elastic bar 31 is pressed by the switch-triggering member 41, such that the first bar head 34 compresses the first spring 33 to generate an elastic force toward the fourth edge 144. Therefore, the elastic force guides the switch-triggering member 41 to allow the button 40 to be kept at the predetermined position of the shell plate 11. Similarly, if the button 40 deflects from the predetermined position toward the fourth edge 144, the second bar head 38 of the second elastic bar 35 is pressed by the switch-triggering member 41, such that the second bar head 38 compresses the second spring 37 to generate an elastic force toward the third edge 143. Therefore, the elastic force guides the switch-triggering member 41 to allow the button 40 to be kept at the predetermined position of the shell plate 11. Accordingly, the button 40 can be prevented from being deflected so as to provide a proper operation feeling and sensitivity for the user during operation. Moreover, the mouse device 1 can be prevented from having non-uniform spacing on the outer surface of the mouse device 1 (for example, the spacing between the two buttons 40, 40' of the mouse device 1), such that the product quality of the mouse device 1 can be improved.

In some embodiments, the first elastic bar 31 and the second elastic bar 35 may be retractable elastic bars with different structures.

As above, in the mouse device of one or some embodiments of the instant disclosure, the first elastic bar and the second elastic bar are disposed at the hole edge, and the switch-triggering member of the button is sandwiched between the first free end of the first elastic bar and the second free end of the second elastic bar. Therefore, when the button is assembled on the shell plate deflectedly, the first elastic bar or the second elastic bar can provide elastic force to guide the button to a predetermined position of the button, thereby preventing the deflection of the button and thus providing a proper operation feeling and sensitivity for the user during operation. Moreover, in one or some embodiments of the instant disclosure, the mouse device can have a beautiful appearance to improve the product quality.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A mouse device comprising:
a casing comprising a shell plate, wherein the shell plate has a through hole, and the through hole has a hole edge;
a button disposed on the shell plate, wherein the button comprises a switch-triggering member, and the switch-triggering member is penetrated through the through hole; and
an elastic guiding structure comprising a first elastic bar and a second elastic bar, wherein the first elastic bar is disposed at the hole edge and extends toward the switch-triggering member to have a first free end, the second elastic bar is disposed at the hole edge and extends toward the switch-triggering member to have a second free end, and the switch-triggering member is sandwiched between the first free end and the second free ends;
wherein the first elastic bar and the second elastic bar are substantially in parallel with each other, wherein the hole edge has a width, and wherein a length of the first elastic bar is greater than half of the width, and a length of the second elastic bar is greater than half of the width.

2. The mouse device according to claim 1, wherein the hole edge comprises a first edge and a second edge opposite to the first edge, the first elastic bar integrally extends from the first edge, and the second elastic bar integrally extends from the second edge.

3. The mouse device according to claim 2, wherein a first reinforcing block is integrally connected to a corner between the first elastic bar and the first edge.

4. The mouse device according to claim 1, wherein the hole edge comprises a first edge and a second edge opposite to the first edge, and the first elastic bar and the second elastic bar integrally extend from the first edge, respectively.

5. The mouse device according to claim 4, wherein a first reinforcing block is integrally connected to a corner between the first elastic bar and the first edge.

6. The mouse device according to claim 1, further comprising a second button, wherein the second button is disposed on the shell plate, wherein the button and the second button are arranged on the shell plate along an arrangement direction, and wherein an extension direction of the first elastic bar and an extension direction of the second elastic bar are perpendicular to the arrangement direction.

7. The mouse device according to claim 1, wherein the switch-triggering member comprises a slot, and wherein an engaging member extends from the hole edge of the through hole, and the engaging member is correspondingly received in the slot.

8. A mouse device comprising:
a casing comprising a shell plate, wherein the shell plate has a through hole, and the through hole has a hole edge;
a button disposed on the shell plate, wherein the button comprises a switch-triggering member, and the switch-triggering member is penetrated through the through hole; and
an elastic guiding structure comprising a first elastic bar and a second elastic bar, wherein the first elastic bar is disposed at the hole edge and extends toward the switch-triggering member to have a first free end, the second elastic bar is disposed at the hole edge and extends toward the switch-triggering member to have a second free end, and the switch-triggering member is sandwiched between the first free end and the second free end;
wherein the first elastic bar has a first side portion adjacent to the second elastic bar, and the second elastic bar has a second side portion adjacent to the first elastic bar, wherein the first side portion has a first protrusion adjacent to the first free end, and the second side portion has a second protrusion adjacent to the second free end, and wherein the switch-triggering member of the button is sandwiched between the first protrusion and the second protrusion.

9. A mouse device comprising:
a casing comprising a shell plate, wherein the shell plate has a through hole, and the through hole has a hole edge;
a button disposed on the shell plate, wherein the button comprises a switch-triggering member, and the switch-triggering member is penetrated through the through hole; and
an elastic guiding structure comprising a first elastic bar and a second elastic bar, wherein the first elastic bar is disposed at the hole edge and extends toward the switch-triggering member to have a first free end, the second elastic bar is disposed at the hole edge and extends toward the switch-triggering member to have a second free end, and the switch-triggering member is sandwiched between the first free end and the second free end;
wherein the first elastic bar and the second elastic bar are retractable elastic bars, and the first elastic bar and the second elastic bar are arranged along a same imaginary extension line.

10. The mouse device according to claim 9, wherein the hole edge comprises a third edge and a fourth edge opposite to the third edge, wherein the first elastic bar comprises a first bar body, a first spring, and a first bar head, wherein the first bar body extends from the third edge, the first spring is fitted over the first bar body, and the first bar head is movably disposed at an end portion of the first bar body and is connected to the first spring, and wherein the first free end is at an end portion of the first bar head.

11. The mouse device according to claim 9, wherein the hole edge comprises a third edge and a fourth edge opposite to the third edge, wherein the first elastic bar comprises a first bar body, a first spring, and a first bar head, wherein the first bar body is retractably disposed at the third edge, the first spring is fitted over the first bar body, and the first bar head is connected to an end portion of the first bar body and is connected to the first spring, and wherein the first free end is at an end portion of the first bar head.

12. The mouse device according to claim 9, further comprising a second button, wherein the second button is disposed on the shell plate, wherein the button and the second button are arranged on the shell plate along an arrangement direction, and wherein an extension direction of the first elastic bar and an extension direction of the second elastic bar are in parallel with the arrangement direction.

\* \* \* \* \*